(12) United States Patent
Stucki et al.

(10) Patent No.: US 10,386,936 B2
(45) Date of Patent: Aug. 20, 2019

(54) POWER WHEELCHAIR HAND CONTROL WITH DUAL CONFIGURABLE KEYPADS

(71) Applicant: Curtis Instruments Inc., Mount Kisco, NY (US)

(72) Inventors: Thomas Stucki, Utzenstorf (CH); Thomas Kurzen, Kriegstetten (CH); Christof Zurbrugg, Biberist (CH); Marcel Born, Biberist (CH); Kurt Stump, Batterkinden (CH)

(73) Assignee: Curtis Instruments Inc., Mount Kisco, NY (US)

( * ) Notice: Subject to any disclaimer, the term of this patent is extended or adjusted under 35 U.S.C. 154(b) by 31 days.

(21) Appl. No.: 15/409,737

(22) Filed: Jan. 19, 2017

(65) Prior Publication Data

US 2018/0203522 A1  Jul. 19, 2018

(51) Int. Cl.

| | |
|---|---|
| *G06F 3/02* | (2006.01) |
| *A61G 5/04* | (2013.01) |
| *A61G 5/10* | (2006.01) |
| *B60L 50/50* | (2019.01) |
| *A61G 5/12* | (2006.01) |

(52) U.S. Cl.
CPC .......... *G06F 3/0219* (2013.01); *A61G 5/045* (2013.01); *A61G 5/1059* (2013.01); *A61G 5/1091* (2016.11); *B60L 50/50* (2019.02); *G06F 3/0213* (2013.01); *G06F 3/0227* (2013.01); *A61G 5/1089* (2016.11); *A61G 5/122* (2016.11); *A61G 5/128* (2016.11); *A61G 2203/14* (2013.01); *A61G 2203/16* (2013.01); *B60L 2200/34* (2013.01); *B60L 2250/12* (2013.01); *B60L 2250/16* (2013.01); *B60L 2250/24* (2013.01)

(58) Field of Classification Search
CPC .... G06F 3/0219; G06F 3/0213; G06F 3/0227; A61G 5/122; A61G 5/1091; A61G 5/128; A61G 5/045; A61G 5/1059; B60L 15/42; B60L 2200/34; B60L 2200/16; B60L 2200/24
See application file for complete search history.

(56) References Cited

U.S. PATENT DOCUMENTS

2006/0110203 A1* 5/2006 Grafton ............... G06F 3/01
  400/489
2006/0294472 A1* 12/2006 Cheng ............... G06F 3/0489
  715/771

(Continued)

OTHER PUBLICATIONS

"XKeys Joystick Controller.pdf" published Mar. 18, 2015, downloadable from website https://web.archive.org/web/20150318052848/http://www.ergocanada.com:80/detailed_specification_pages/pi_engineering_xkeys_joystick_controller_46_key.html.*

*Primary Examiner* — Wing H Chow
(74) *Attorney, Agent, or Firm* — Harrington & Smith

(57) ABSTRACT

Disclosed herein is a personal mobility vehicle hand control. The personal mobility vehicle hand control includes a housing, a display, a first keypad, a second keypad, and a joystick. The display is proximate an end of the housing. The first keypad is proximate the display. The second keypad is proximate an opposite end of the housing. The joystick is between the first keypad and the second keypad. At least one key of the first keypad is configurable to correspond with a function displayed on the display. At least one key of the second keypad is configurable to correspond with the same function displayed on the display.

17 Claims, 4 Drawing Sheets

(56) References Cited

U.S. PATENT DOCUMENTS

2007/0056780 A1\* 3/2007 Jaenke ................... A61G 5/04
 180/65.1
2010/0331081 A1\* 12/2010 Holenweg ................ A61G 5/10
 463/30

\* cited by examiner

POWER WHEELCHAIR HAND CONTROL WITH DUAL CONFIGURABLE KEYPADS

BACKGROUND

Field of the Invention

The invention relates to personal mobility vehicles and, more particularly, to a control system for a personal mobility vehicle such as a wheelchair.

Brief Description of Prior Developments

Self-powered personal mobility vehicles, such as wheelchairs having a self-contained power source to provide drive power to wheels and steering actuators, may include various systems to control the various power and motive subsystems of the vehicle, as well as to implement a user interface function enabling an occupant of the vehicle to control the overall operation of the vehicle, such as to start, stop and steer the vehicle.

Users with varying degrees of disability require their wheelchair input devices, such as the hand control, to be configurable to match their needs, accordingly there is a need to provide improved and reliable hand control configurations.

SUMMARY

In accordance with one aspect of the invention, a personal mobility vehicle hand control is disclosed. The personal mobility vehicle hand control includes a housing, a display, a first keypad, a second keypad, and a joystick. The display is proximate an end of the housing. The first keypad is proximate the display. The second keypad is proximate an opposite end of the housing. The joystick is between the first keypad and the second keypad. At least one key of the first keypad is configurable to correspond with a function displayed on the display. At least one key of the second keypad is configurable to correspond with the same function displayed on the display.

In accordance with another aspect of the invention, a personal mobility vehicle is disclosed. The personal mobility vehicle includes a control unit and a personal mobility vehicle hand control. The control unit has at least one data processor. The personal mobility vehicle hand control is connected to the control unit. The personal mobility vehicle hand control includes a housing, a display, a first keypad, a second keypad, and a joystick. The display is proximate an end of the housing. The first keypad is proximate the display. The second keypad is proximate an opposite end of the housing. The joystick is between the first keypad and the second keypad. At least one key of the first keypad is configurable to correspond with a function displayed on the display. At least one key of the second keypad is configurable to correspond with the same function displayed on the display.

In accordance with another aspect of the invention, a method is disclosed. A personal mobility vehicle hand control including a housing is provided. A display is provided proximate an end of the housing. A first keypad is provided proximate the display. A second keypad is provided proximate an opposite end of the housing. A joystick is provided between the first keypad and the second keypad. At least one key of the first keypad is configurable to correspond with a function displayed on the display. At least one key of the second keypad is configurable to correspond with the same function displayed on the display.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
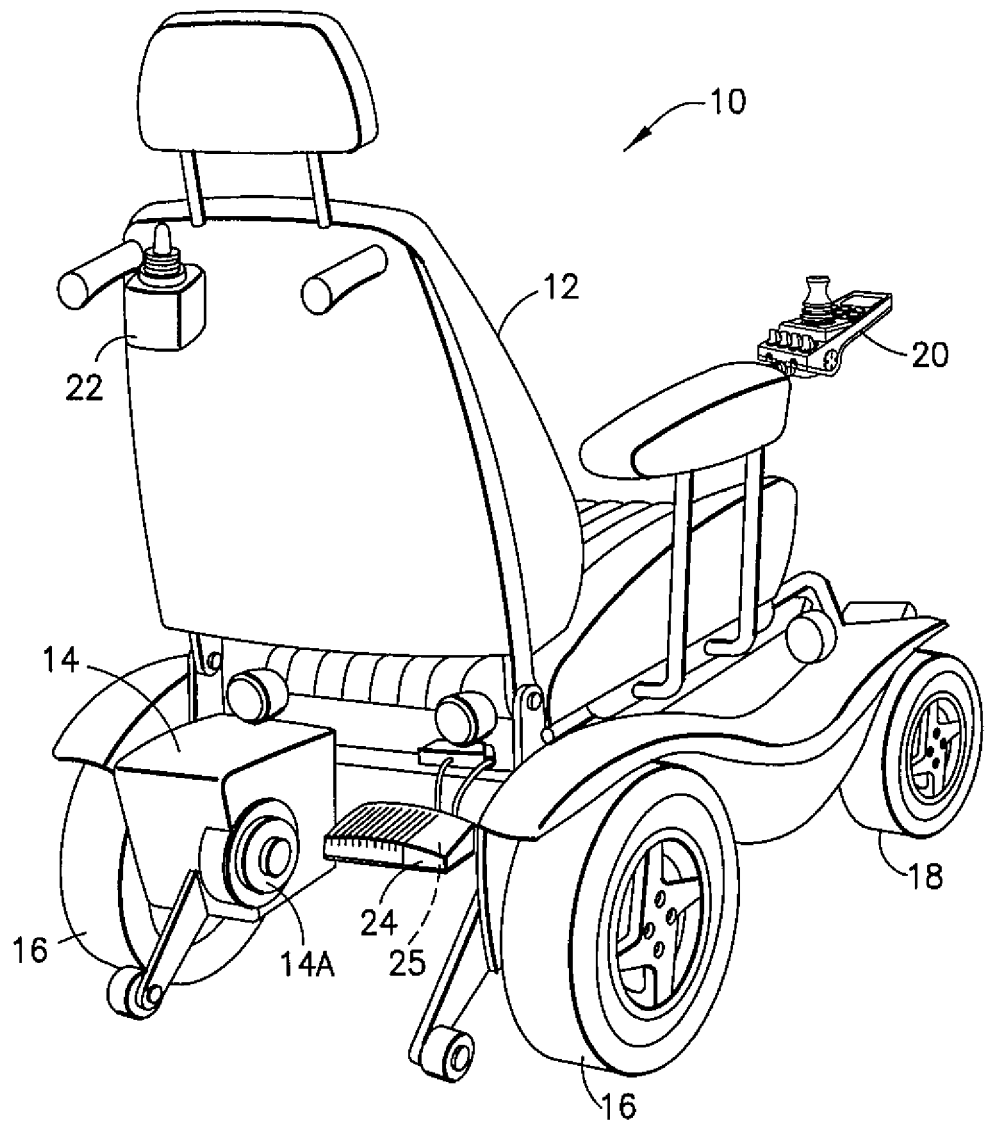
FIG. 1 is a perspective view of a personal mobility vehicle incorporating features of the invention.

Referring to FIG. 1, there is shown a perspective view of a personal mobility vehicle 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

In the embodiment shown in FIG. 1 the personal mobility vehicle is embodied as a wheelchair system 10, although this is not a limitation upon the use and practice of the exemplary embodiments of this invention. As employed herein a wheelchair system is considered as a vehicle that may be capable of controlled, self-powered (e.g., battery powered) movement for a sitting person.

The wheelchair system 10 includes a seat portion 12, a power source 14, such as a battery and related power conversion, conditioning and recharging circuitry, and at least two wheels 16 that are driven by the power source 14 via at least one motor 14A. One or more other wheels 18 provide stability and enable steering of the wheelchair system 10. In this regard there is a user-actuated hand control system (or user interface) 20. An attendant control system 22 may also be provided. The control system 20 operates with a control system of controller (or control unit) 24 to provide functions that include, but need not be limited to, starting and stopping motive power to the drive wheels 16, controlling the direction of rotation and speed of rotation of the drive wheels 16, and controlling a pointing direction of the wheels 18 to provide steering of the wheelchair 10.

Figure 2:
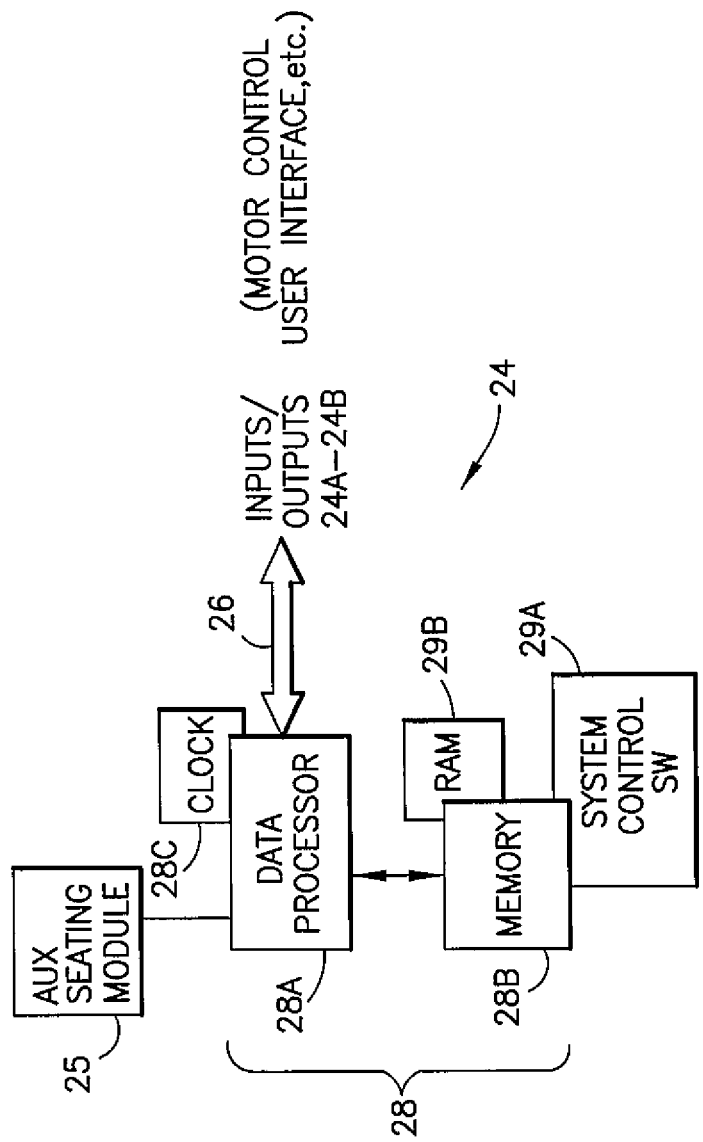
FIG. 2 is a simplified block diagram of a portion of a controller used in the personal mobility vehicle shown in FIG. 1.

FIG. 2 shows a simplified block diagram of a portion of the controller 24. The controller 24 can be assumed to include a software system 28 that includes at least one data processor 28A, such as a microprocessor or microcontroller, and a memory 28B that stores programs to control operation of the data processor 28A and, thereby, to control the overall operation of the wheelchair 10. The operating programs, also referred to as system control software (SW) 29A, may include firmware, such as computer programs that are permanently stored in, by example, non-volatile flash memory, or system control SW 29A may be stored in volatile random access memory (RAM) 29B that is loaded from an SD card or flash type of memory storage medium. The exemplary embodiments of this invention are also usable with a system where a system control SW 29A is stored in a mass memory device, such as SD card(s) and/or flash memory(ies), and loaded into RAM as needed.

The data processor 28A is coupled via general use input/output hardware 26 to various input/outputs, including general input/outputs, such as input/outputs 24A going to and from the user-actuated hand control system 20 and inputs/outputs 24B providing control to the motor(s) 14. A clock function or module 28C can be included for maintaining an accurate time of day and calendar function.

According to some embodiments of the invention, the controller 24 can further be connected to a wireless interface (WI) 30, such as a Bluetooth™ interface, for example. However, any suitable type of wireless interface or connection may be provided.

Figure 3:
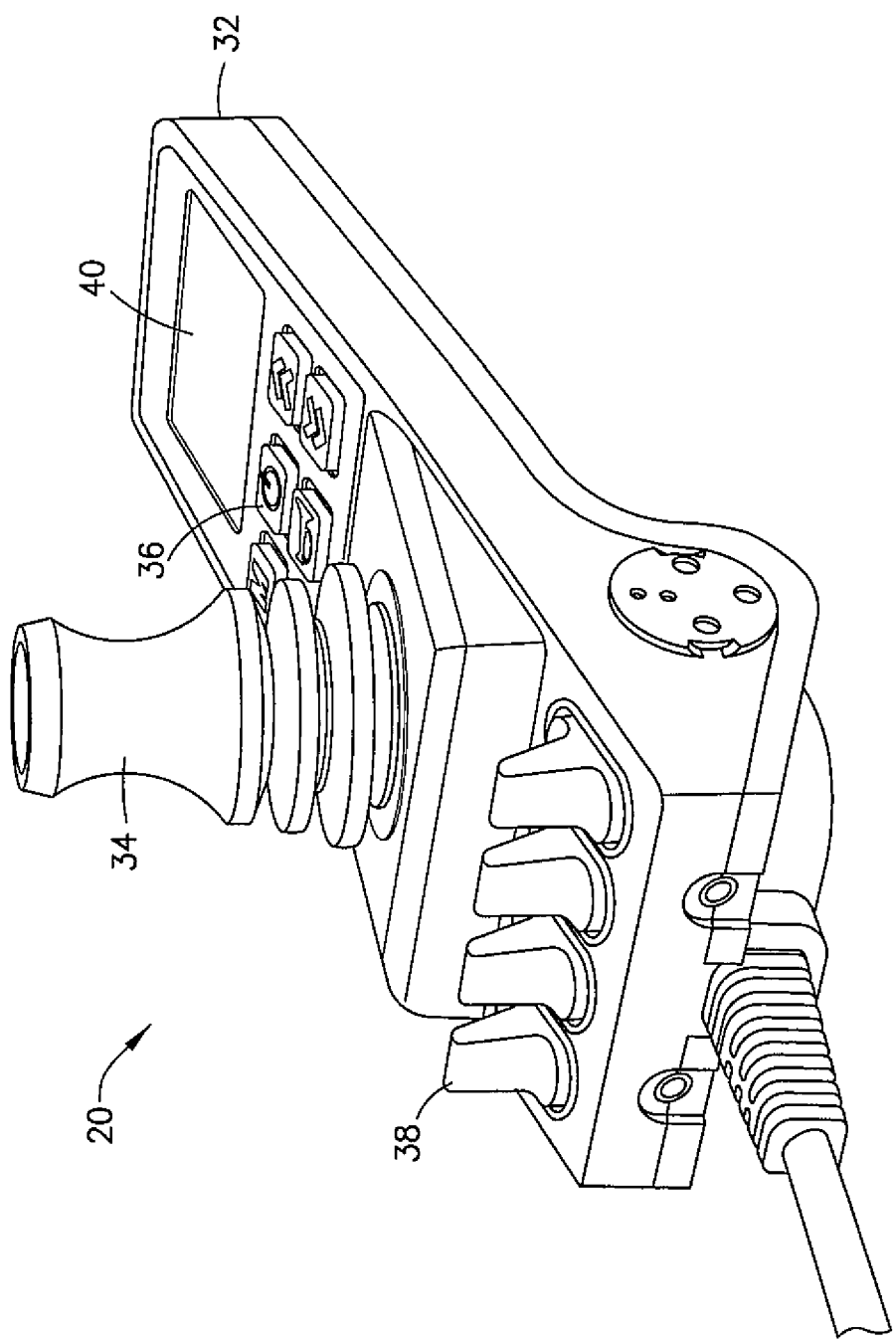
FIG. 3 is a perspective view of a personal mobility vehicle hand control used in the personal mobility vehicle shown in FIG. 1.

Referring now also to FIG. 3, the user-actuated hand control system (or user interface) 20 includes a housing 32, a joystick type controller 34, a first keypad 36, a second keypad 38, and a display 40, such as an LCD, LED or other suitable type of display system. The first keypad 36 is located in front of the joystick 34 (and between the joystick 34 and the display 40). The second keypad 38 is located behind (or on the rear side of) the joystick 34. Each of the keys on the keypad 36, 38 may comprise any suitable type of key such as press keys, toggle keys, touch, virtual/soft keys, etc. Additionally, it should be noted that although the figures illustrate the first keypad as having six press keys and the second keypad as having four toggle keys, one skilled in the art will appreciate that the various embodiments of the invention are not necessarily so limited and that any suitable number, type, or combination of keys may be provided.

The user-actuated hand control system 20 generally allows the user to control the various functions of the wheelchair. For example, the user-actuated hand control system 20 operates with the control system of the controller 24 or a seat or auxiliary module (or auxiliary seating module) 25 to provide functions that include, but need not be limited to, starting and stopping motive power to the drive wheels 16, controlling the direction of rotation and speed of rotation of the drive wheels 16, controlling a pointing direction of the wheels 18 to provide steering of the wheelchair 10, controlling a seat function, and controlling auxiliary functions. According to various exemplary embodiments of the invention, the user-actuated hand control system 20 may be directly connected to the controller 24 (such as by a cable, for example).

The user-actuated hand control system 20 provides improvements over single keypad conventional configurations by allowing for operation of the personal mobility vehicle 10 with user input from a keypad in front of the joystick, and/or for operation of the personal mobility vehicle 10 with user input from a keypad behind the joystick.

Various exemplary embodiments of the invention provide a solution which allows the handcontrol to be fully adjustable with regard to usability, based on the current need of a user. For example, for a user that is comfortable with the keypad in front of the joystick, the keys on the rear side of the joystick can be freely configured for every possible function the wheelchair offers and suits the user. Typically, these keys would be configured for easy/fast access of functions (e.g. seat functions). For a user who has difficulty operating the keys in front of the joystick, the keys on the rear side of the joystick can be freely configured to access all available functions, to the extent of obviating the need for the front keypad. Additionally, since the keys from the keypad on the rear side are freely configurable, the actual functions they contain will be displayed on an area of the display. Furthermore, for the keys on the rear side, there may be more than one set of functions for the keys. If there is more than one set of functions, the set of functions can be chosen by operating one of the keys as a 'master' (e.g. the leftmost or the rightmost keys). The keys in front of the joystick also are freely configurable as well. This provides for the capability that the functionality of each key on each keypad 36, 38 can be configured.

Figure 4:
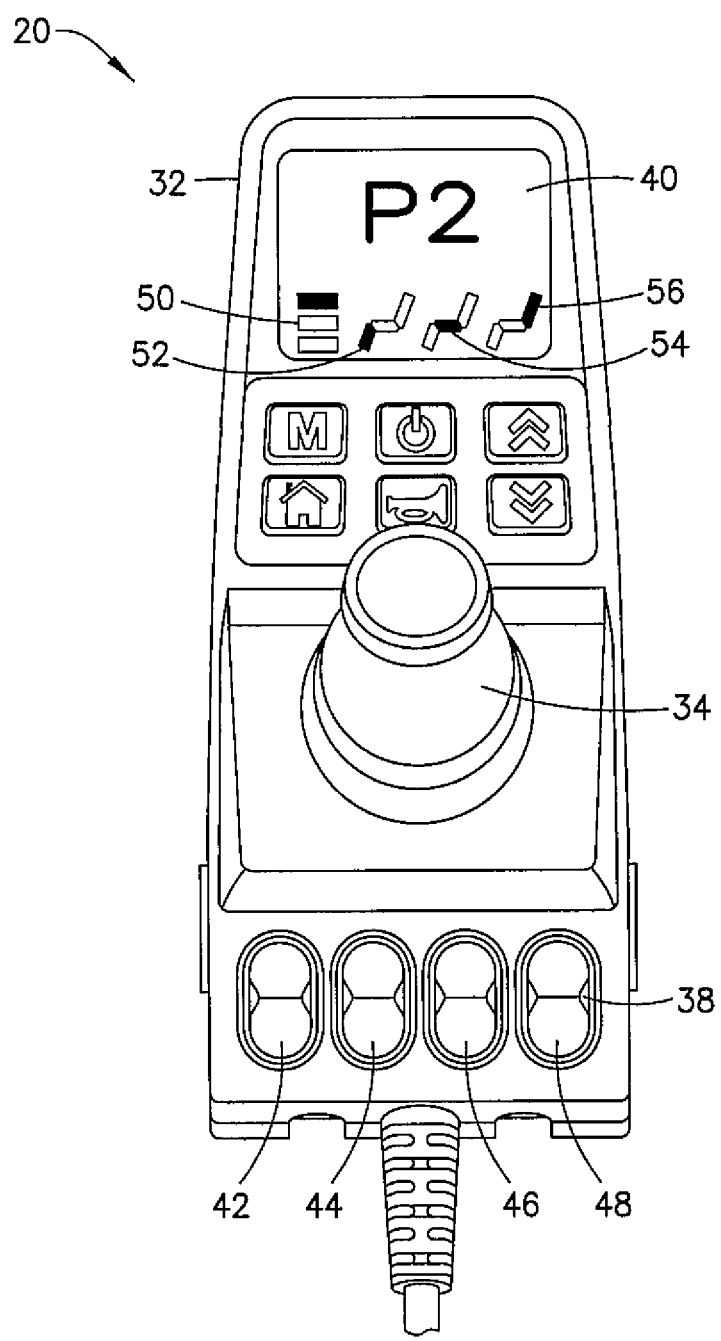
FIG. 4 is a top view of the personal mobility vehicle hand control shown in FIG. 3.

Referring now also to FIG. 4, there is shown an exemplary configuration of the keys of the keypads 36, 38, wherein the current functions of the keys on the second keypad 38 are displayed in an area of the display 40. For example, key 42 of the second keypad 38 corresponds to a first area 50 of the display 40 and shows that there is more than just one set of functions. The active set of functions can be chosen by operating this key 42. Key 44 of the second keypad 38 corresponds to a second area 52 of the display 40 and based on the currently chosen function set, key 44 shows a function for "leg adjustment". Key 46 of the second keypad 38 corresponds to a third area 54 of the display 40 and based on the currently chosen function set, key 46 shows a function for "seat elevate". Key 48 of the second keypad 38 corresponds to a fourth area 56 of the display 40 and based on the currently chosen function set, key 48 shows a function for "backrest adjustment". In some other alternative embodiments, there may be just one set of functions for the keys. In this case, key 42 would have a certain, singular function, however any suitable configuration may be provided.

Technical effects of any one or more of the exemplary embodiments provide a dual configurable keypad configuration providing for the functionality of each key on each keypad 36, 38 to be configurable by the user. This provides for greater usability (based on the current needs of the user) when compared to conventional configurations. Many of the conventional power wheel chair handcontrols are typically comprised of a joystick, a display, and a single keypad (on only a single side of the display).

Some users of personal mobility vehicles prefer having the keypad in front of the joystick. Typically, these keys are used for functions that are enabled while the wheel chair is in drive mode. There are other users who have great difficulty operating keys located in front of the joystick due to the level of their disability. For these users, operating keys on the rear side of the joystick is preferred and advantageous. It is also possible that a user may be initially comfortable using the keys in the front of the joystick but as the disability progresses the keys in the back of the joystick are preferred. Thus technical effects of any one or more of the exemplary embodiments provide users (with varying degrees of disability) of the personal mobility vehicle with wheelchair input devices, such as the handcontrol 20, that are configurable to match their needs.

It should be understood that components of the invention can be operationally coupled or connected and that any number or combination of intervening elements can exist (including no intervening elements). The connections can be direct or indirect and additionally there can merely be a functional relationship between components.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a personal mobility vehicle hand control is disclosed. The personal mobility vehicle hand control comprises: a housing; a display proximate an end of the housing; a first keypad proximate the display; a second keypad proximate an opposite end of the housing; and a joystick between the first keypad and the second keypad; wherein at least one key of the first keypad is configurable to correspond with a function displayed on the display, and wherein at least one key of the second keypad is configurable to correspond with the same function displayed on the display A personal mobility vehicle hand control as above, wherein the function corresponds to a driving feature, a seat function feature, and/or an auxiliary function feature of the personal mobility vehicle.

A personal mobility vehicle hand control as above, wherein the first keypad comprises press keys, toggle keys, touch, and/or virtual/soft keys.

A personal mobility vehicle hand control as above, wherein the second keypad comprises press keys, toggle keys, touch, and/or virtual/soft keys.

A personal mobility vehicle hand control as above, wherein the first keypad is between the display and the joystick.

A personal mobility vehicle hand control as above, wherein the second keypad is configured to be closer to a user than the joystick, and wherein the first keypad is configured to be farther away from the user than the joystick.

A personal mobility vehicle hand control as above, wherein the personal mobility vehicle controller is configured to be connected to a controller having a data processor.

A personal mobility vehicle comprising: a controller having a data processor; and a personal mobility vehicle hand control as above, wherein the personal mobility vehicle hand control is connected to the controller.

In another exemplary embodiment, a personal mobility vehicle is disclosed. The personal mobility vehicle comprises: a control unit having at least one data processor; and a personal mobility vehicle hand control connected to the control unit, wherein the personal mobility vehicle hand control comprises a housing, a display proximate an end of the housing, a first keypad proximate the display, a second keypad proximate an opposite end of the housing, and a joystick between the first keypad and the second keypad, wherein at least one key of the first keypad is configurable to correspond with a function displayed on the display, and wherein at least one key of the second keypad is configurable to correspond with the same function displayed on the display.

A personal mobility vehicle as above, wherein the personal mobility vehicle comprises a wheelchair.

A personal mobility vehicle as above, wherein the function corresponds to a leg adjustment feature, a seat elevation adjustment feature, or a backrest adjustment feature for a seat portion of the personal mobility vehicle.

A personal mobility vehicle as above, wherein the first keypad comprises press keys, toggle keys, touch, and/or virtual/soft keys.

A personal mobility vehicle as above, wherein the second keypad comprises press keys, toggle keys, touch, and/or virtual/soft keys.

A personal mobility vehicle as above, wherein the first keypad is between the display and the joystick.

A personal mobility vehicle as above, wherein the second keypad is configured to be closer to a user of the personal mobility vehicle than the joystick, and wherein the first keypad is configured to be farther away from the user of the personal mobility vehicle than the joystick.

A personal mobility vehicle as above, wherein the hand control is attached to an armrest of the personal mobility vehicle.

In another exemplary embodiment, a method is disclosed. The method comprises: providing a personal mobility vehicle hand control comprising a housing; providing a display proximate an end of the housing; providing a first keypad proximate the display; providing a second keypad proximate an opposite end of the housing; and providing a joystick between the first keypad and the second keypad; wherein at least one key of the first keypad is configurable to correspond with a function displayed on the display, and wherein at least one key of the second keypad is configurable to correspond with the same function displayed on the display.

A method as above, wherein the function corresponds to a driving feature, a seat function feature, and/or an auxiliary function feature of the personal mobility vehicle.

A method as above, wherein the first keypad and the second keypad each comprise press keys, toggle keys, touch, and/or virtual/soft keys.

A method as above, wherein the first keypad is between the display and the joystick.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A personal mobility vehicle hand control, comprising:
a housing comprising a front end, a rear end, and lateral sides between the front end and the rear end;
a display proximate the front end of the housing, wherein the display is between the lateral sides of the housing;
a first keypad adjacent the display, wherein the first keypad is between the lateral sides of the housing;
a second keypad proximate the rear end of the housing, wherein the second keypad is between the lateral sides of the housing; and
a joystick between the first keypad and the second keypad, wherein the joystick is between the lateral sides of the housing;
wherein at least one key of the first keypad is configurable to correspond with a seat function of a personal mobility vehicle displayed on the display, and wherein at least one key of the second keypad is configurable to correspond with the same seat function of the personal mobility vehicle displayed on the display;
wherein the seat function comprises a first seat function, wherein at least another key of the first keypad is configurable to correspond with a second seat function of the personal mobility vehicle displayed on the display, wherein at least another key of the second keypad is configurable to correspond with the same second seat function of the personal mobility vehicle displayed on the display, and wherein the display is configured to display the first seat function and the second seat function at the same time.

2. The personal mobility vehicle hand control of claim 1 wherein the first keypad comprises press keys, toggle keys, touch, and/or virtual/soft keys.

3. The personal mobility vehicle hand control of claim 1 wherein the second keypad comprises press keys, toggle keys, touch, and/or virtual/soft keys.

4. The personal mobility vehicle hand control of claim 1 wherein the first keypad is between the display and the joystick.

5. The personal mobility vehicle hand control of claim 1 wherein the second keypad is configured to be closer to a user than the joystick, and wherein the first keypad is configured to be farther away from the user than the joystick.

6. The personal mobility vehicle hand control of claim 1 wherein the personal mobility vehicle controller is configured to be connected to a controller having a data processor.

7. A personal mobility vehicle, comprising:
a controller having a data processor; and
a personal mobility vehicle hand control as in claim 1, wherein the personal mobility vehicle hand control is connected to the controller.

8. A personal mobility vehicle, comprising:
a control unit having at least one data processor; and
a personal mobility vehicle hand control connected to the control unit, wherein the personal mobility vehicle hand control comprises a housing, the housing comprising a front end, a rear end, and lateral sides between the front end and the rear end, a display proximate the front end of the housing, wherein the display is between the lateral sides of the housing, a first keypad adjacent the display, wherein the first keypad is between the lateral sides of the housing, a second keypad proximate the rear end of the housing, wherein the second keypad is between the lateral sides of the housing, and a joystick between the first keypad and the second keypad, wherein the joystick is between the lateral sides of the housing, wherein at least one key of the first keypad is configurable to correspond with a seat function of the personal mobility vehicle displayed on the display, wherein at least one key of the second keypad is configurable to correspond with the same seat function of the personal mobility vehicle displayed on the display, and wherein the seat function corresponds to a leg adjustment feature, a seat elevation adjustment feature, or a backrest adjustment feature for a seat portion of the personal mobility vehicle.

9. The personal mobility vehicle of claim 8 wherein the personal mobility vehicle comprises a wheelchair.

10. The personal mobility vehicle of claim 8 wherein the first keypad comprises press keys, toggle keys, touch, and/or virtual/soft keys.

11. The personal mobility vehicle of claim 8 wherein the second keypad comprises press keys, toggle keys, touch, and/or virtual/soft keys.

12. The personal mobility vehicle of claim 8 wherein the first keypad is between the display and the joystick.

13. The personal mobility vehicle of claim 8 wherein the second keypad is configured to be closer to a user of the personal mobility vehicle than the joystick, and wherein the first keypad is configured to be farther away from the user of the personal mobility vehicle than the joystick.

14. The personal mobility vehicle of claim 8 wherein the hand control is attached to an armrest of the personal mobility vehicle.

15. A method comprising:
providing a personal mobility vehicle hand control comprising a housing, the housing comprising a front end, a rear end, and lateral sides between the front end and the rear end;
providing a display proximate the front end of the housing, wherein the display is between the lateral sides of the housing;
providing a first keypad adjacent the display, wherein the first keypad is between the lateral sides of the housing;
providing a second keypad proximate the rear end of the housing, wherein the second keypad is between the lateral sides of the housing; and
providing a joystick between the first keypad and the second keypad, wherein the joystick is between the lateral sides of the housing;
wherein at least one key of the first keypad is configurable to correspond with a seat function and/or an auxiliary function feature of a personal mobility vehicle displayed on the display, and wherein at least one key of the second keypad is configurable to correspond with the same seat function and/or the same auxiliary function feature of the personal mobility vehicle displayed on the display.

16. The method of claim 15 wherein the first keypad and the second keypad each comprise press keys, toggle keys, touch, and/or virtual/soft keys.

17. The method of claim 15 wherein the first keypad is between the display and the joystick.

* * * * *